US008669870B2

United States Patent
Jung et al.

(10) Patent No.: US 8,669,870 B2
(45) Date of Patent: Mar. 11, 2014

(54) LOCATION DEPENDENT MONITORING FOR STOLEN DEVICES

(71) Applicant: Absolute Software Corporation, Vancouver (CA)

(72) Inventors: Byron Jung, Burnaby (CA); Damien Loveland, Richmond (CA)

(73) Assignee: Absolute Software Corporation, Vancouver, British Columbia (CA)

( * ) Notice: Subject to any disclaimer, the term of this patent is extended or adjusted under 35 U.S.C. 154(b) by 0 days.

(21) Appl. No.: 13/752,212

(22) Filed: Jan. 28, 2013

(65) Prior Publication Data

US 2013/0241729 A1 Sep. 19, 2013

Related U.S. Application Data

(63) Continuation of application No. 12/698,980, filed on Feb. 2, 2010, now Pat. No. 8,362,901.

(60) Provisional application No. 61/149,189, filed on Feb. 2, 2009.

(51) Int. Cl.
*G08B 13/14* (2006.01)

(52) U.S. Cl.
USPC ............. 340/568.1; 340/539.13; 340/568.8; 340/500; 455/404.2; 455/456.1

(58) Field of Classification Search
USPC ........... 340/539.13, 500, 568.1, 568.8, 572.1; 455/899, 404.2, 456.1
See application file for complete search history.

(56) References Cited

U.S. PATENT DOCUMENTS

| 6,501,421 | B1 | 12/2002 | Dutta et al. |
| 7,453,355 | B2 * | 11/2008 | Bergstrom et al. ...... 340/539.13 |
| 8,406,736 | B2 * | 3/2013 | Das et al. ...................... 455/410 |
| 2004/0147255 | A1 * | 7/2004 | Lee ............................ 455/422.1 |
| 2005/0007456 | A1 * | 1/2005 | Lee et al. .................. 348/207.99 |
| 2008/0072284 | A1 * | 3/2008 | Horvitz et al. .................... 726/2 |
| 2009/0181640 | A1 * | 7/2009 | Jones ......................... 455/404.2 |
| 2009/0323972 | A1 * | 12/2009 | Kohno et al. .................. 380/284 |
| 2010/0269674 | A1 * | 10/2010 | Brown et al. ................... 89/1.11 |

FOREIGN PATENT DOCUMENTS

WO 2006/035231 A1 4/2006

* cited by examiner

*Primary Examiner* — Eric M Blount
(74) *Attorney, Agent, or Firm* — Knobbe, Martens, Olson & Bear, LLP

(57) ABSTRACT

A system and method for controlling the surveillance conducted by lost or stolen electronic devices dependent upon the location of such electronic devices is provided. A data repository contains data that specifies, for each of a plurality of geographic regions (e.g. legal jurisdictions), a set of surveillance methods that are permissible in the respective region. At least some of the geographic regions have different respective sets of permissible surveillance methods than others. A computer system is operable to communicate with the devices over a computer network, and programmed to use received information regarding a location of a potentially lost or stolen device, in combination with the data in the computer data repository, to cause the potentially lost or stolen device to initiate surveillance according to the set of permissible surveillance methods (and/or other actions) corresponding to the location.

35 Claims, 2 Drawing Sheets

LOCATION DEPENDENT MONITORING FOR STOLEN DEVICES

CROSS-REFERENCE TO RELATED APPLICATIONS

This application is a continuation of U.S. application Ser. No. 12/698,980, filed Feb. 2, 2010, which claims the benefit of U.S. provisional patent application No. 61/149,189, filed Feb. 2, 2009. The disclosures of the aforesaid applications are hereby fully incorporated by reference.

BACKGROUND

1. Technical Field

The present disclosure relates to controlling the behavior of stolen electronic devices according to the location in which they are located.

2. Description of the Related Art

The theft of electronic devices such as personal computers, laptop computers, personal digital assistants, mobile phones and personal entertainment devices is prevalent and there is an ongoing need to recover such property. Further, proprietary or sensitive data is often stored in such devices, so the need to recover such devices as rapidly as possible is self-evident. Existing tracking methods include monitoring the IP address of a computer that is connected to the internet, monitoring a GPS location of a computer or tracking device, keystroke logging and monitoring images captured from a computer's camera. It is important that the techniques used are within the law and minimize the risk of legal actions taken against an investigator.

Often, an item stolen in one country is taken to another country in order to reduce the likelihood of it being retrieved, and possibly so that it can be sold more easily. There are significant differences between civil law countries and common law countries regarding the sale of stolen property. In common law countries, the original owner tends to be favored because the thief cannot pass on good title to anyone. In civil law countries, a bona fide purchaser (i.e. a buyer who believes that the seller and goods are legitimate) tends to be favored, particularly following a period of limitations during which an original owner can make a claim. A problem can occur if an automatic surveillance device is unaware of its location and inadvertently starts monitoring and/or recording private information of someone who is considered a bona fide purchaser. This problem may arise if, for example, a stolen item with a tracking or monitoring device is taken across a border from a common law country to a civil law country, or if a statutory period of limitations expires within a civil law country. Laws may also vary between states or different regions of the same country.

There are, of course, exceptions to the general rules relating to the sale of stolen property in both common law and civil law countries, and there can be complicated qualifications to the rules. For example, the period of limitations for claiming back stolen goods may start running from the moment of the theft in one country, from the moment the owner became aware of the theft in another country, or from the moment the location of the goods becomes known. Moving the goods from one country to another to clear the title, and then back to the original country may cause further complications.

Another example that complicates the issue of using surveillance to help recover stolen goods is the extent to which an invasion of privacy can be justified by a competing interest. Different countries can have different standards as to what is considered a competing interest, and how far privacy can be compromised in the retrieval of stolen goods.

By way of example of background art, U.S. Pat. No. 5,944,790 discloses a system and method for displaying a webpage which is dependent on the location of the requesting computer.

PCT Application WO 00/022495 describes a method and apparatus in which a download of a digital product is supplied according to the territory of the request.

U.S. Pat. No. 6,125,446 describes a method for a computer such that its operation depends on its location as determined by a worldwide positioning system.

U.S. Pat. No. 6,954,147 describes a laptop that requires a password to operate it if it is taken outside a predetermined boundary.

SUMMARY

Since different countries have different laws, the surveillance and recovery techniques taken often need to be adapted to each legal jurisdiction. Accordingly, various jurisdiction-sensitive systems and methods addressing the need to track stolen electronic devices and monitor their usage are provided.

This summary is not an extensive overview intended to delineate the scope of the subject matter that is described and claimed herein. The summary presents aspects of the subject matter in a simplified form to provide a basic understanding thereof, as a prelude to the detailed description that is presented below. Neither this summary nor the following detailed description purports to define or limit the invention; the invention is defined only by the claims.

A system and method for controlling the surveillance conducted by lost or stolen electronic devices dependent upon the location of such electronic devices is provided. A data repository contains data that specifies, for each of a plurality of geographic regions (e.g. legal jurisdictions), a set of surveillance methods that are permissible in the respective region. At least some of the geographic regions have different respective sets of permissible surveillance methods than others. A computer system is operable to communicate with the devices over a computer network, and programmed to use the received information regarding a location of a potentially lost or stolen device, in combination with the data in the computer data repository, to cause the potentially lost or stolen device to initiate surveillance according to the set of permissible surveillance methods (and/or other actions) corresponding to said location. The device may also be configured to change the surveillance methodology based on the passage of a certain amount of time, and overt actions may optionally also be taken when the device crosses or approaches a border, with the aim of influencing someone in unauthorized possession of the device to return it to or keep it in a jurisdiction more favorable for its retrieval. The surveillance rule may be stored in the device or it may be retrievable from a remote server via, for example, the internet.

BRIEF DESCRIPTION OF THE DRAWINGS

For a fuller understanding of the nature and advantages of the disclosed subject matter, as well as the preferred mode of use thereof, reference should be made to the following detailed description, read in conjunction with the accompanying drawings. In the following drawings, like reference numerals designate like or similar parts or steps.

DETAILED DESCRIPTION OF THE PREFERRED EMBODIMENTS

Terminology

Figure 1:
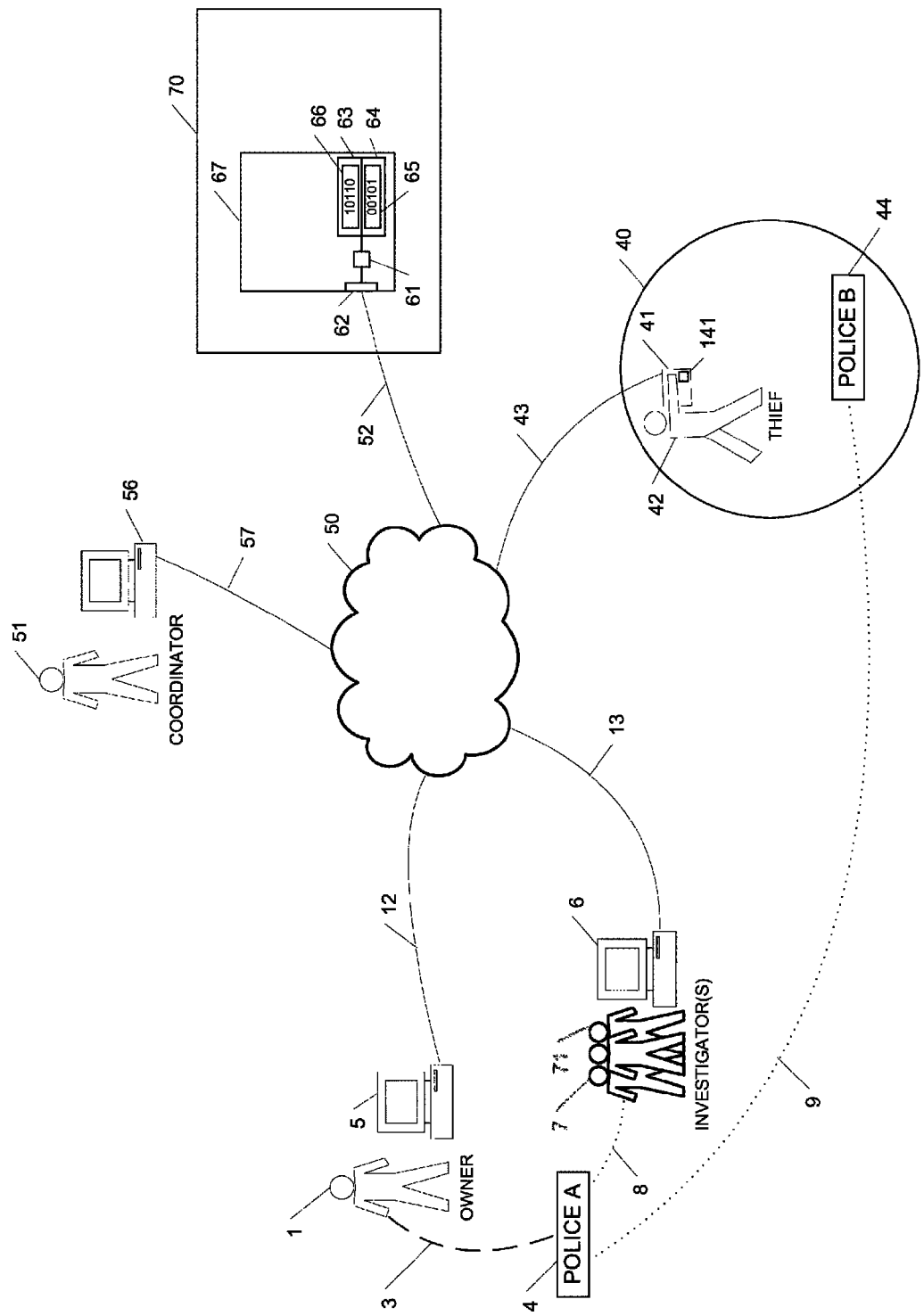
FIG. 1 is a schematic functional block diagram of a system in accordance with an embodiment of the disclosed subject matter, showing the main components of the system and the people who interact with it; and, FIG. 2 is a functional flow diagram schematically representing the flow process of a system in accordance with an embodiment of the disclosed subject matter, showing the interactions of a stolen device, the coordinator, an investigator and an owner with the system.

Device—The term "device" refers herein to an electronic device that may be stolen. The device may be any electronic device such as a laptop computer, a personal computer, a cellphone, a Blackberry®, an iPhone®, an iPod®, an iPad™, an electronic book, a personal gaming device or a memory module. The device can also be referred to as a "client", and more specifically as a client of a monitoring center. The device typically has a name, an ID, or electronic serial number ("ESN") with which it can be identified. The device can be a tracking apparatus that is attached to an item that does not have the electronic capabilities to perform the disclosed functions itself. The device could be an apparatus that is embedded in or around an object to be protected—such as the frame of a valuable painting.

Agent—as used herein, is a software, hardware or firmware agent that is persistent and stealthy, and that resides in a computer or other electronic device. The agent provides servicing functions which require communication with a remote server. The agent is ideally tamper resistant and is enabled for supporting and/or providing one or more services such as data delete, firewall protection, data encryption, location tracking, message notification, surveillance and software deployment and updates. An illustrative embodiment of an agent is found in the commercially available product Computrace Agent™. The technology underlying the Computrace Agent™ has been disclosed and patented in the U.S. and other countries, which patents have been commonly assigned to Absolute Software Corporation. See, for example, U.S. Pat. Nos. 5,715,174; 5,764,892; 5,802,280; 6,244,758; 6,269,392; 6,300,863; and 6,507,914; and related foreign patents. Details of the persistent function of the agent are disclosed in U.S. Patent Application Publication Nos. US2005/0216757 and US2006/0272020. All of these documents are fully incorporated by reference as if fully set forth herein. It is feasible to use an equivalent agent to the Computrace Agent™, or less preferably an alternative agent with less functionality. The minimal functional attributes of the agent are: (1) to communicate stealthily with a monitoring center; (2) to self-repair; and (3) to provide location specific information to the remote server. Communications may be initiated by the agent, by the monitoring center or by both.

Monitoring Center—This is a remote server, guardian server or other computer or server that the agent communicates with or sends a message to. For example, provided an interne connection is available to the device, an agent may call the monitoring center once a day (or at some other selected suitable interval) to report the location of the device. Communications may also be via, for example, a telephone network such as a cellular or satellite network, and they may use SMS services. In one embodiment, the monitoring may be an email server that receives messages from a remote device, and/or it may be considered as the computer or other equipment used to retrieve email messages from an email server. The monitoring centre may be distributed in more than one location.

Owner—This term is generally used to refer to the person who legitimately operates the device. The term may also be used for someone who is authorized by the owner, which could be an employee or a person to whom a device is rented or loaned.

The detailed descriptions within are presented largely in terms of methods or processes, symbolic representations of operations, functionalities and features of the subject matter disclosed. These method descriptions and representations are the means used by those skilled in the art to most effectively convey the substance of their work to others skilled in the art. A software implemented method or process is here, and generally, conceived to be a self-consistent sequence of steps leading to a desired result. These steps require physical manipulations of physical quantities. Often, but not necessarily, these quantities take the form of electrical or magnetic signals capable of being stored, transferred, combined, compared, and otherwise manipulated. It will be further appreciated that the line between hardware, software and firmware is not always sharp, it being understood by those skilled in the art that software implemented processes may be embodied in hardware, firmware, or software, in the form of coded instructions such as in microcode and/or in stored programming instructions.

All of the methods and tasks described herein, excluding those identified as performed by a human, may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other computer-readable storage medium. Where the system includes multiple computing devices, these devices may, but need not, be co-located. The results of the disclosed methods and tasks may be persistently stored by transforming physical storage devices, such as solid state memory chips and/or magnetic disks, into a different state.

Exemplary Embodiment

A diagram of a preferred embodiment of the jurisdiction based stolen device monitoring system is shown by way of example in FIG. 1. The system generally comprises a monitoring centre 70 connected via data communication link 52 and the internet 50 to one or more remote terminals 5, 6 and 56. Other remote terminals may be connected via data communication links and the internet to the monitoring centre 70.

The monitoring centre comprises a server 67, in turn comprising components usually found in a server, such as a processor 61 and electronic memory 63, 64, the electronic memory 63 carrying computer readable instructions 66 that can be acted upon by the processor 61 in order to fulfill functions of the system, and the electronic memory 64 carrying computer readable data 65 that is stored and processed in order for the system to operate as described. Also included is an interface 62 between the server 67 and the internet 50. The server 67 may, in some embodiments, include multiple physical computers that interact over a network.

Scenario

A typical scenario in which the system is used can also be seen in FIG. 1, and is described in relation to a stolen laptop 41. However, it is equally valid with a tracking device or an electronic device other than a laptop. An owner 1 becomes aware that his/her laptop 41 is missing and informs 3 the police 4 having authority in the same locality as where the theft occurred. The owner then finds an internet access point or remote terminal 5 connectable via data communications link 12, the internet 50 and data communications link 52 to the system's server 67. At remote terminal 5, the owner 1 provides information to the server 67 pertaining to the fact that his laptop 41 has been stolen and provides details of the police report filed. A flag is set in the server 67 to indicate that the laptop has been stolen. Alternately, the owner 1 may provide such information to the server 67 at a later time, and in a different locality. For example, the owner 1 can provide details of the theft from a remote terminal at work, or he may provide details via a remote terminal at home.

Meanwhile, the stolen laptop 41 could be anywhere, and has been depicted in this scenario to be in the hands of a thief 42 in country 40. The agent 141 in stolen laptop 41 is configured to communicate with the server 67 in the monitoring center 70 via communication link 43, the internet 50 and communication link 52. The agent 141 in the laptop 41 may initiate the communication at a set time or after a set delay, or it may be configured to accept a communication call from the server 67 in the monitoring center 70.

When the laptop 41 communicates with the monitoring centre 70, the monitoring center 70 determines or is notified (by the laptop 41 or a third party locating system) of the location and ID of the laptop 41. With this information, the system checks the status of the stolen flag corresponding to the ID and in this case determines that a theft has occurred. The system determines the country in which the laptop is currently located and accesses stored data that includes an identification of permissible surveillance tools for each country. For example, the surveillance tools might perform the following tasks (or a subset thereof), which may be selected based on the identified location:

IP address logging; GPS location logging; Keystroke logging; Image recording; Video recording; Screen capture; Message display.

Each surveillance tool or group of surveillance tools may require a different level of permission to invoke, so the database includes this information, and it also includes information as to the authorization level actually obtained. For example, an owner may give authorization for the IP address of his computer to be logged, but a warrant may need to be obtained for camera images to be logged.

In an example scenario, the system instructs the agent 141 in the stolen laptop 41 to start (or continue) recording IP addresses after it becomes aware of the theft. The system determines that keystrokes may be logged, but only with permission from a higher authority in the country 40, and informs a coordinator 51 via email using link 57. The coordinator 51 then attempts to obtain the necessary authorization, either directly, via an investigator 7, or via the police 4 to whom the theft was reported. It could involve obtaining a court order. It may involve contacting the police 44 in the country 40 where the laptop 41 is located.

The server 67 sends (or is configured to provide upon request) details of the laptop 41's ID and location, via link 52, internet 50, and link 13 to remote terminal 6 operated by one of a team of investigators 7 covering thefts in the locality in which the theft occurred. The investigator 7 may be physically located in the locality of the theft or elsewhere, or may be located in the monitoring centre 70, in which case links 13, 52 via the internet 50 would not be needed. The details may initially be sent to a manager 71 of the team of investigators who distributes the task of investigating to one or more of the investigators 7 that is/are a member of the team.

When enough surveillance information has been collected and collated, the investigator 7 uses his established working relationship and/or communication link(s) 8 with the police 4 to transfer the information to them. Once all the relevant and necessary information has been gathered and transferred to the police 4 having authority in the same locality as where the theft occurred (Police Department A), they can transfer the file through official channels 9 to the police 44 (Police Department B) operating in the country 40 of the stolen device 41.

The system therefore results in the collection of a legally appropriate level of information and its efficient transfer to the police 44 in the country 40 where the laptop 41 is located, through the appropriate channels, in order to help them recover the stolen laptop.

Functional Operation

Figure 2:
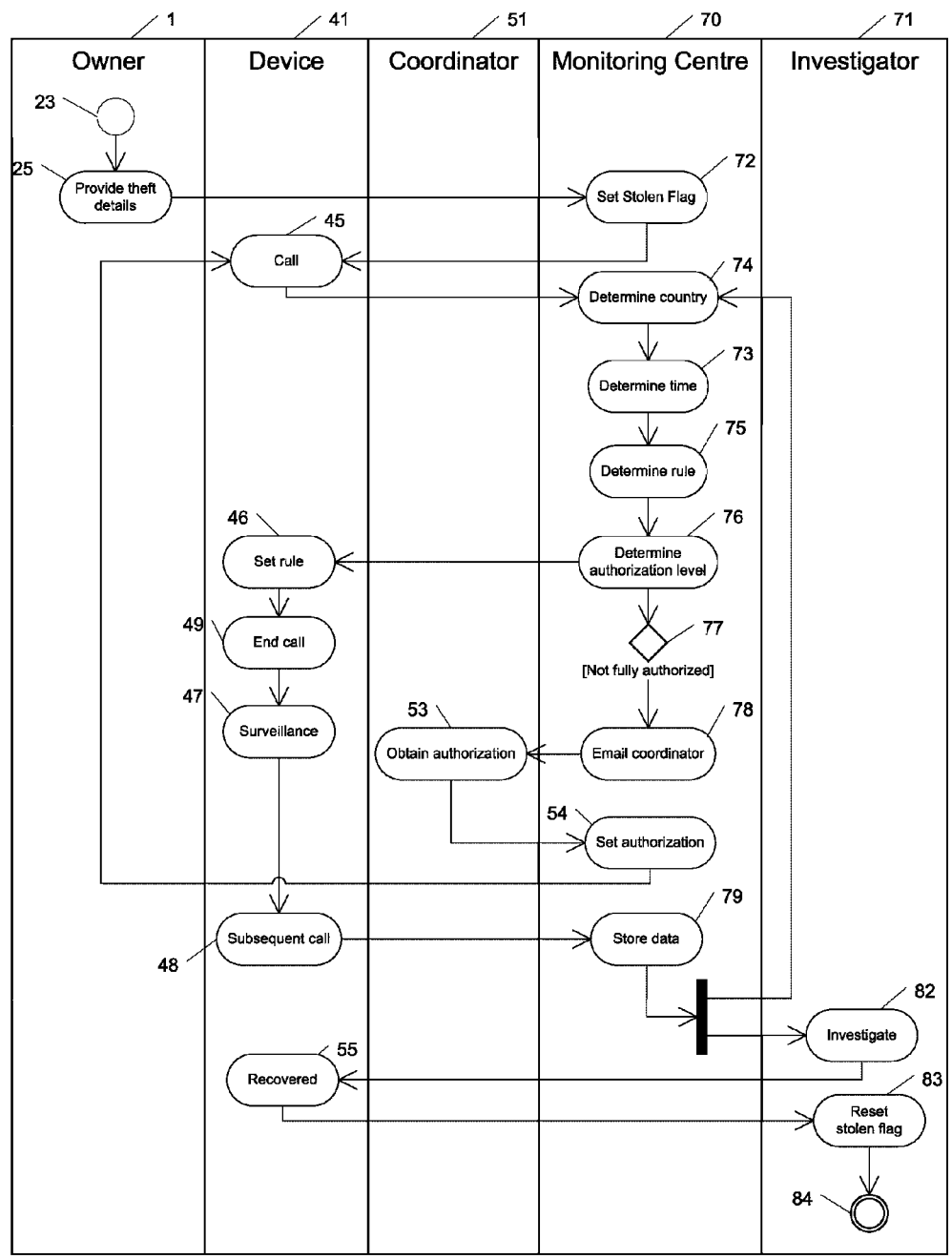

FIG. 2 is a flow chart showing the interactions of various people and the stolen device with the system. An owner 1 discovers 23 that his device 41 has been stolen and so provides 25 details of the theft to the police. Details of the theft are also reported to the monitoring centre 70 by any suitable means, such as by phone, fax or via an internet connection. On receiving the details of the theft, the monitoring centre 70 sets 72 flags for the device 41 that has been reported stolen—these flags could be a stolen flag, a first call awaited flag and/or a flag to shorten the calling interval. The date and possibly also the time of the theft is also recorded by the monitoring centre 70 at this step.

When the stolen device 41 subsequently calls in 45 to the monitoring centre 70, the country in which the device 41 is located is determined 74 by the monitoring centre 70, either from the stolen device 41's IP address (which may be determined by a traceroute routine or supplied by the device) or from a physical location (determined, for example, by GPS, A-GPS, WiFi hotspot signal strength detection, cell tower triangulation, etc.). The IP address of the device 41 may be used to determine the country or jurisdiction in which the device 41 is located because certain ranges of IP address are assigned to certain countries or to certain ISPs that operate in such countries. ISPs dynamically assign IP addresses from their respective pools to subscribers' devices.

The time of the call 45 is compared with the recorded time of the theft (from step 72) in order to calculate 73 the period of time that has passed since the theft. The surveillance rule for the country in which the device 41 is located is then retrieved 75 from a database (e.g. item 65 of FIG. 1) in the monitoring centre 70 or to which the monitoring centre 70 has access. The rule may be based on the elapsed time since the theft. Since laws change from time to time, the database 65 is preferably maintained remotely from the device 41, and can be updated with fresh data by a coordinator 51 or other appropriate person as and when laws are amended. Some laws may be unknown, in which case a default rule can be stored.

The monitoring centre 70, on retrieving 75 the surveillance rule for the country in which the device 41 is located, also determines the type of recovery tool(s) that can be invoked, depending on the information available for the country (or other jurisdiction) that the device 41 is located in, and the level of authorization needed in that country. According to the maximum level of existing authorization 76 then available in relation to device 41, an instruction is sent to the device 41, or agent 141 in the device 41, to set 46 the surveillance rule accordingly. The sending of the instruction (at step 46) may result in the existing surveillance rule in device 41 being changed or left unaltered. For example, the device 41 by default may have been providing IP address information, and there may be no further authorization to utilize other tools, so the rule is left unaltered. Otherwise, the rule may be set to invoke any or all of the surveillance tools mentioned above (and possibly others). As well as surveillance tools, other tools may also be triggered, such as encryption software, data delete software and/or data retrieval software. The call then ends 49 and the device 41 proceeds to undertake surveillance 47 according to the rule that has been set, if any.

If 77 no authorization or insufficient authorization has been obtained, or it has not been entered into the database 65, then the system sends 78 an alert to the coordinator 51, which alert could be an automatically generated email. The coordinator 51 then attempts to obtain the required authorization 53, either from the owner or administrator of the device 41, or in cooperation with the investigating police force or forces. Once authorization has been obtained, the coordinator sets it 54 in the database 65 of the monitoring centre 70 so that on the next call 45 by device 41 the instruction can be given 46 to the device 41 to invoke a more sophisticated recovery tool. If 77 the required authorization level has already been obtained, steps 78, 53 and 54 are not needed. Note, however, that these steps may later be needed if the device is moved to another jurisdiction.

During a call 48 subsequent to surveillance, the recorded data is sent in part or in whole to the monitoring centre 70 where it is stored 79 for later investigation 82 by an investigator 7 or police officer. During the call 48, a check is remade 74 on the country (or other jurisdiction) in which the device is located, and any necessary adjustments to the surveillance rules are made.

If the investigation 82 is successful and the device 41 is recovered 55, the investigator 71 or other appropriate person can reset 83 the stolen flag in the monitoring centre 70, after which the process ends 84. The whole process can be repeated if the device 41 is stolen again.

Database

Below is a simple example of the data that might be stored in a database for the system to be able to function correctly. The most basic information is the country (or other jurisdiction) and the permitted tool. The authorization level needed may also be included in the basic information. The example table is relevant for laptops and other portable computing devices such as cell phones, smart phones, electronic books, electronic pads, PDAs and also PC's, and includes devices that can accept keystrokes (whether real, virtual or touchscreen equivalents), display data and/or images, and/or capture camera images (stills or video).

For example, the table of data shows that in country "E" it is permissible for an owner of a device to authorize IP address logging and GPS location, but a court order is needed to be able to monitor keystrokes, screenshots and camera images. In country "F" the data shows that no surveillance should be undertaken following three years after the theft, because after that time it is not possible for an original owner to claim stolen goods from a bona fide purchaser. It is assumed that in most cases the thief will have sold the stolen equipment.

It is also possible to override the rules if an individual case warrants it. For example, the limitation period may be measured from different events, and may depend on how events unfold.

| Country | Type | Limitation period/years | Tool | Authorization |
|---------|------|------------------------|------|---------------|
| E | Common | None | IP Address, GPS | Owner |
| | | | Keystroke, Screenshot, Camera images | Court |
| F | Civil | 3 | GPS IP Address | Owner |
| U | Common | None | IP Address, GPS | Owner |
| | | | Keystroke, Screenshot | Police |
| S | Civil | 5 | GPS | Owner |
| J | Civil | 2 | GPS, IP address | Owner |
| X | Civil | Unknown | Display message | Owner |

In country "X" the police may not be equipped or may be unwilling to pursue the theft of stolen laptops, for example due to being overwhelmed from time to time with more serious crimes. Such information may be included in updates made to the database by a coordinator or investigator. In these circumstances, the aim is then to encourage the thief to bring the computer to a jurisdiction where the chances of being retrieved are considerably higher. In this case, the detection that a stolen computer is in such a country can trigger the lockdown of the computer and the display of a message such as "Out of range. This computer is configured to function only in the U.S.". Such actions will make the computer next to worthless unless it is brought to the U.S., in which case the lock will automatically be removed, the stolen computer will function normally and monitoring of a thief or unauthorized user can continue, with a greater probability of the computer's retrieval.

Even as a border is approached, a warning message may by displayed on the computer informing the user that it is configured to work only in the U.S., without disrupting the normal functioning of the computer.

The table can be expanded to accommodate more complex rules, which may depend on certain events and the times they occur, which would be input into the database by an investigator as and when they occurred. Alternately, certain rules may depend on the countries the device has passed through.

Variations

To retrieve a device in countries where the bona fide purchaser is favored, the original owner may have to pay the bona fide purchaser the amount he paid, which may not be economical. In these situations, the stolen device may be programmed to become inoperable, and/or to display a screen message instructing its return, either to the original owner or another jurisdiction. In these countries, the system may be programmed to automatically encrypt new files created after the date of the theft, or following a predetermined time after the theft—e.g. 45 days. In conjunction with this, a message can be displayed informing the user that it is stolen, and that it should be taken back to the person from whom it was obtained. There is more chance of stolen goods being recoverable from a thief than a bona fide purchaser. Alternately, the message could instruct the user to return the laptop to the original owner, indicate that the refund to which a bona fide purchaser is entitled will be paid, and also indicate that the bona fide purchaser may also purchase the decryption key from the original owner. The amounts may be the same or different.

The surveillance data may be encrypted by the laptop before sending to the monitoring centre. The encryption key may be set by a police officer and transmitted to the laptop, so that only the police officer can have access to the data. The officer may enter a password via an internet connection to the monitoring centre, or it may be via the entry of a numeric code entered via a telephone.

Instead of storing data at the monitoring centre in step 79, the data may be sent directly to a police officer. Such an instruction may be given to the laptop during one of its calls to the monitoring centre.

It may be the case that different owners have purchased or require different service levels. For example, a premium service level may specify immediate investigative action, in which case the monitoring centre 70 and laptop device 41 should be configured such that the monitoring centre 70 can initiate calls to the laptop 41, for example by an internet connection or via a cellular or satellite communications network connection. In one case, the monitoring centre 70 could send an SMS message to the laptop 41, which then causes the agent 141 to wake up the laptop 41, if necessary, and start to record surveillance information. In contrast, a regular service may require starting investigation only after the stolen device 41 calls in, according to the next call time programmed into the agent.

The specified steps in the process can be made in a different order to that shown, and certain steps may be given priority over other steps. Some of the steps may be omitted and others may be included which may depend on other parameters not mentioned herein.

Communications between the monitoring centre and the stolen devices may be via a telecommunications network, such as a cellular or satellite telephone network. This may be as well as, or instead of communicating via the internet. There may be a dedicated communication link for the agent, which is separate from communication link(s) used for the otherwise normal operation of the device.

The disclosed subject matter has been presented as interacting with investigators who are outside the police, preferably employees of a security company. However, it can be envisaged that the investigators are police officers. Where police officers have been described as interacting with the system, other persons approved by the police or legal authorities may interact instead.

GPS positioning has been used as an example, but other positioning methods may be used, such as assisted-GPS, WiFi signal strength detection, cell tower triangulation, and other yet to be developed methods.

The database(s) mentioned in this disclosure may be separate databases, distributed databases or some may be combined in a single database.

Communication links between the various parts of the system can be different. Some links may be shown as dual purpose or bidirectional, but in practice could be two separate links.

Devices may be preprogrammed with the tracking rules, and so would not need to receive communication from a monitoring centre. Alternately, devices may be triggered by receiving an email, page, phone call or SMS message, and may send their surveillance data to an email address.

The surveillance rules may be configured to change upon crossing from one region, state or province to another within the same country.

A device may be battery powered, mains powered or solar powered.

The present description is of the best presently contemplated mode of carrying out the subject matter disclosed and claimed herein. The description is made for the purpose of illustrating the general principles of the subject matter and not be taken in a limiting sense; the claimed subject matter can find utility in a variety of implementations without departing from the scope of the invention made, as will be apparent to those of skill in the art from an understanding of the principles that underlie the invention. The scope of the invention is best determined with reference to the appended claims.

What is claimed is:

1. A method for facilitating recovery of stolen devices, comprising:
    maintaining, in computer storage, data that specifies, for each of a plurality of geographic regions, a set of surveillance methods that are permissible in the respective region, wherein at least some of the geographic regions have different respective sets of permissible surveillance methods than others;
    detecting that an electronic device is reported as stolen;
    determining, based on information recorded by the electronic device, a geographic region in which the electronic device is located; and
    in connection with detecting that the electronic device is reported as stolen, causing the electronic device to initiate surveillance using the set of permissible surveillance methods corresponding to the geographic region in which the electronic device is located, such that the electronic device monitors a potential thief during use of the electronic device in compliance with surveillance rules corresponding to the geographic region.

2. The method of claim 1, further comprising causing the electronic device to output a message that notifies the potential thief that the electronic device will not function properly if moved outside said geographic region.

3. The method of claim 1, further comprising causing the electronic device to output a message that notifies the potential thief of an alternate geographic region to which the electronic device can be moved to cause a function of the electronic device to become available.

4. The method of claim 1, wherein the method is performed in part by a computer system that is separate from the electronic device.

5. The method of claim 1, wherein the geographic regions correspond to legal jurisdictions.

6. The method of claim 1, wherein at least some of the geographic regions correspond to different respective countries.

7. The method of claim 1, wherein the data additionally specifies a surveillance method for which authorization is required in said geographic region, and the method further comprises automatically initiating a request for authorization to use said surveillance method on the electronic device.

8. A system, comprising:
    a computer data repository that stores data specifying, for each of a plurality of geographic regions, a set of surveillance methods that are permissible in the respective region, wherein at least some of the geographic regions have different respective sets of permissible surveillance methods than others; and
    non-transitory computer storage having stored thereon executable program code that is responsive to a reported theft of an electronic device by using information regarding a location of the device, in combination with said data, to cause the electronic device to initiate surveillance according to the set of permissible surveillance methods that are permissible in the geographic region in which the electronic device is located, such that the electronic device monitors a potential thief according to geographic region dependent surveillance methods.

9. The system of claim 1, wherein the executable program code is configured to cause the electronic device to notify the potential thief that the electronic device will not function properly if moved outside said geographic region in which the electronic device is located.

10. The system of claim 1, wherein the executable program code is configured to cause the electronic device to notify the potential thief of an alternate geographic region to which the electronic device can be moved to cause a function of the electronic device to become available.

11. The system of claim 1, wherein the computer data repository is part of a computer system that is separate from the electronic device.

12. The system of claim 1, wherein the computer data repository is stored on the electronic device.

13. The system of claim 1, wherein the data additionally specifies a surveillance method for which authorization is required in said geographic region in which the electronic device is located, and the executable program code is configured to initiate a request for authorization to use said surveillance method on the electronic device.

14. An electronic device that increases its chances of retrieval when stolen, the device configured to:
receive a notification to initiate surveillance according to a set of permissible surveillance methods corresponding to a geographic region in which said device is located;
initiate said surveillance; and
display or emit a signal to induce a user of the device to either maintain the device in the geographic region or transport the device to a different geographic region depending on which of said regions provides a greater chance of retrieval of the device.

15. The electronic device of claim 14 further configured to determine information regarding a location of the device.

16. The electronic device of claim 15 further configured to send the information regarding the location to a remote server.

17. The electronic device of claim 16 further configured to receive a notification of the set of permissible surveillance methods from the remote server.

18. The electronic device of claim 14 wherein surveillance is not performed by the device immediately prior to receiving the notification.

19. The electronic device of claim 14 wherein the device performs IP address logging immediately prior to receiving the notification.

20. The electronic device of claim 14, wherein said geographic regions correspond to legal jurisdictions.

21. The electronic device of claim 14, wherein the set of permissible surveillance methods is time-dependent.

22. The electronic device of claim 14, wherein the notification is an SMS message.

23. The electronic device of claim 14, wherein the device wakes up upon receiving the notification.

24. The electronic device of claim 14, further configured to encrypt data obtained from said surveillance.

25. The electronic device of claim 14, further configured to send data obtained from said surveillance to a remote server.

26. The electronic device of claim 14, further configured to trigger a lock dependent on the geographic region or the different geographic region.

27. The electronic device of claim 14, further configured to display a message instructing the user to return the device to a person from whom the device was obtained.

28. The electronic device of claim 14, wherein the signal is displayed or emitted without disrupting normal functioning of the device.

29. The electronic device of claim 14, further configured to encrypt files that are created on the device after the notification has been received.

30. The electronic device of claim 14, wherein the set of permissible surveillance methods are selected from IP address logging; GPS location logging; keystroke logging; image recording; video recording; and screen capture.

31. The electronic device of claim 14 further configured to detect an approach to a border and to display or emit said signal as a consequence of said approach.

32. Non-transitory computer storage which stores program code that instructs an electronic device to:
receive a notification to initiate surveillance according a set of permissible surveillance methods corresponding to a geographic region in which said device has a location;
initiate said surveillance; and
display or emit a signal to induce a user of the device to either maintain the device in the geographic region or transport the device to a different geographic region depending on which of said regions provides a greater chance of retrieval of the device.

33. The non-transitory computer storage of claim 32, wherein the program code further instructs the electronic device to:
determine information regarding said location of the device;
send the information regarding the location to a remote server;
receive the notification of the set of permissible surveillance methods from the remote server;
send data obtained from said surveillance to the remote server;
detect an approach to a border; and
display or emit said signal as a consequence of said approach.

34. The non-transitory computer storage of claim 33, wherein said geographic regions correspond to legal jurisdictions.

35. The non-transitory computer storage of claim 33, wherein the set of permissible surveillance methods is time-dependent.

* * * * *